(12) United States Patent
Bhatnagar et al.

(10) Patent No.: US 11,197,197 B2
(45) Date of Patent: Dec. 7, 2021

(54) DYNAMIC LOAD BALANCING OF GATEWAY ACCESS POINTS

(71) Applicant: ARRIS Enterprises LLC, Suwanee, GA (US)

(72) Inventors: Hemant Bhatnagar, Sunnyvale, CA (US); Ta-Chien Lin, Molnlycke (SE); Nagaraja Subhas, Davanagere (IN); Srinivasulu Venkataramaiah, Bengaluru (IN); Kishor Kumar Hosur Nagaraju, Mysore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/894,779

(22) Filed: Jun. 6, 2020

(65) Prior Publication Data

US 2020/0389817 A1    Dec. 10, 2020

Related U.S. Application Data

(60) Provisional application No. 62/858,434, filed on Jun. 7, 2019.

(51) Int. Cl.
*H04W 28/08* (2009.01)
*H04L 29/12* (2006.01)
(Continued)

(52) U.S. Cl.
CPC ..... *H04W 28/0812* (2020.05); *H04L 61/2015* (2013.01); *H04W 28/0835* (2020.05);
(Continued)

(58) Field of Classification Search
None
See application file for complete search history.

(56) References Cited

U.S. PATENT DOCUMENTS

| 10,158,569 | B2 | 12/2018 | Chirreddy et al. |
| 10,432,525 | B2 | 10/2019 | Chirreddy et al. |

(Continued)

OTHER PUBLICATIONS

Al Mumun, et al., "An active access-point configuration algorithm for elastic wireless local-area network system using heterogeneous devices." In: International Journal of Networking and Computing. Jul. 2016 (Jul. 2016).

(Continued)

*Primary Examiner* — Kenny S Lin
(74) *Attorney, Agent, or Firm* — Steven Stupp; Stewart Wiener

(57) ABSTRACT

During operation, an access point receives a message a message from a second access point with second information specifying loading of the second access point. Then, the access point receives a Dynamic Host Configuration Protocol (DHCP) request from an electronic device with an Internet protocol (IP) address of the access point and a media access control (MAC) address of the electronic device. Next, the access point determines, based at least in part on information specifying loading of the access point, the second information and the MAC address, an assigned IP address of a gateway for the electronic device to access a second network, where the assigned IP address is one of: the IP address of the access point, or a second IP address of the second access point. Moreover, the access point provides a DHCP response to the electronic device with the assigned IP address.

20 Claims, 6 Drawing Sheets

(51) Int. Cl.
    *H04W 84/22* (2009.01)
    *H04W 88/08* (2009.01)
    *H04W 88/16* (2009.01)
    *H04W 84/12* (2009.01)

(52) U.S. Cl.
    CPC ........ *H04L 61/103* (2013.01); *H04L 61/6022* (2013.01); *H04W 84/12* (2013.01); *H04W 84/22* (2013.01); *H04W 88/08* (2013.01); *H04W 88/16* (2013.01)

(56) References Cited

U.S. PATENT DOCUMENTS

| | | |
|---|---|---|
| 2009/0083406 A1 | 3/2009 | Harrington et al. |
| 2012/0230189 A1* | 9/2012 | Fang .................... H04L 63/067 370/230 |
| 2014/0254471 A1 | 9/2014 | Fang et al. |
| 2014/0293795 A1* | 10/2014 | Xiao ..................... H04W 36/22 370/236 |
| 2015/0120864 A1* | 4/2015 | Unnimadhavan ... H04L 67/1008 709/217 |
| 2015/0172957 A1 | 6/2015 | Sarawat et al. |
| 2016/0088521 A1 | 3/2016 | Ho et al. |
| 2016/0112944 A1* | 4/2016 | Zhou ................ H04W 36/0072 370/338 |
| 2016/0295485 A1 | 10/2016 | Ponnuswamy |
| 2018/0084518 A1* | 3/2018 | Cattoni ............... H04L 61/2038 |
| 2019/0379602 A1 | 12/2019 | Chirreddy et al. |

OTHER PUBLICATIONS

International Search Report and the Written Opinion of the International Searching Authority corresponding to International Patent Application No. PCT/US2020/036512 (11 pages) (dated Aug. 18, 2020).

* cited by examiner

DYNAMIC LOAD BALANCING OF GATEWAY ACCESS POINTS

CROSS-REFERENCE TO RELATED APPLICATION

This application claims priority under 35 U.S.C. 119(e) to: U.S. Provisional Application Ser. No. 62/858,434, "Dynamic Load Balancing of Gateway Access Points," filed on Jun. 7, 2019, by Hemant Bhatnagar et al., the contents of which are herein incorporated by reference.

BACKGROUND

Field

The described embodiments relate to techniques for communicating information among electronic devices. Notably, the described embodiments relate to techniques for performing dynamic load balancing among access-point gateways to a network.

Related Art

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard. For example, a wireless network may include an access point that communicates wirelessly with one or more associated electronic devices (which are sometimes referred to as 'clients').

In some deployments, a wireless network includes a hierarchical arrangement of access points, including access points that wireless communicate with associated electronic devices and each other via wired or wireless communication. In addition, the hierarchical arrangement may include one or more access points that functions as a gateway to another network (such as the Internet). However, depending on the activity in the wireless network, the one or more gateway access points can become overloaded, which can result in degraded communication performance between the wireless network and the other network.

SUMMARY

The described embodiments relate to an access point that provides dynamic load balancing. This access point includes: a network node; an antenna node that couples to an antenna; and an interface circuit. The interface circuit may communicate via wired or wireless communication with an electronic device in a WLAN and may communicate via wired communication with a second access point in the WLAN and a second electronic device in a second network, where the wired communication in the second network is compatible with a backhaul communication protocol. During operation, the access point may receive a message from the second access point, where the message includes second information specifying loading of the second access point. Then, the access point may receive a Dynamic Host Configuration Protocol (DHCP) request from the electronic device, where the DHCP request includes an Internet protocol (IP) address of the access point and a media access control (MAC) address of the electronic device. Next, the access point may determine, based at least in part on information specifying loading of the access point, the second information and the MAC address, an assigned IP address of a gateway for the electronic device to access the second network, where the assigned IP address is one of: the IP address of the access point, or a second IP address of the second access point. Moreover, the access point may provide a DHCP response to the electronic device, where the DHCP response specifies the assigned IP address.

Note that the access point may determine the assigned IP address using one of: a hash function, or a look-up table.

Moreover, the access point may determine the assigned IP address based at least in part on at least a characteristic of the electronic device. For example, the characteristic may include: a capability of the electronic device, a configuration of the electronic device or an operating system of the electronic device. Alternatively or additionally, the characteristic may include a communication metric of the electronic device, where the communication metric corresponds to throughput or capacity during one or more prior instances of communication with the electronic device.

Furthermore, the backhaul communication protocol may include: a cable modem communication protocol, or a communication protocol that provides mobile Long Term Evolution (LTE) backhaul, e.g., to a mobile network core.

Additionally, the second access point may provide redundancy coverage for DHCP functions of the access point.

In some embodiments, the information includes available memory in the access point and the second information includes available memory in the second access point. Alternatively or additionally the information may include available throughput or capacity of the access point and the second information may include available throughput or capacity of the second access point.

Note that the access point may include: a processor; and memory that stores program instructions. When executed by the processor, the program instructions may cause the access point to perform at least the determining operation.

Another embodiment provides an access point that the redundancy coverage.

Another embodiment provides a computer-readable storage medium for use with the access point. When executed by the access point, this computer-readable storage medium causes the access point to perform at least some of the aforementioned operations.

Another embodiment provides a method, which may be performed by the access point. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures. and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
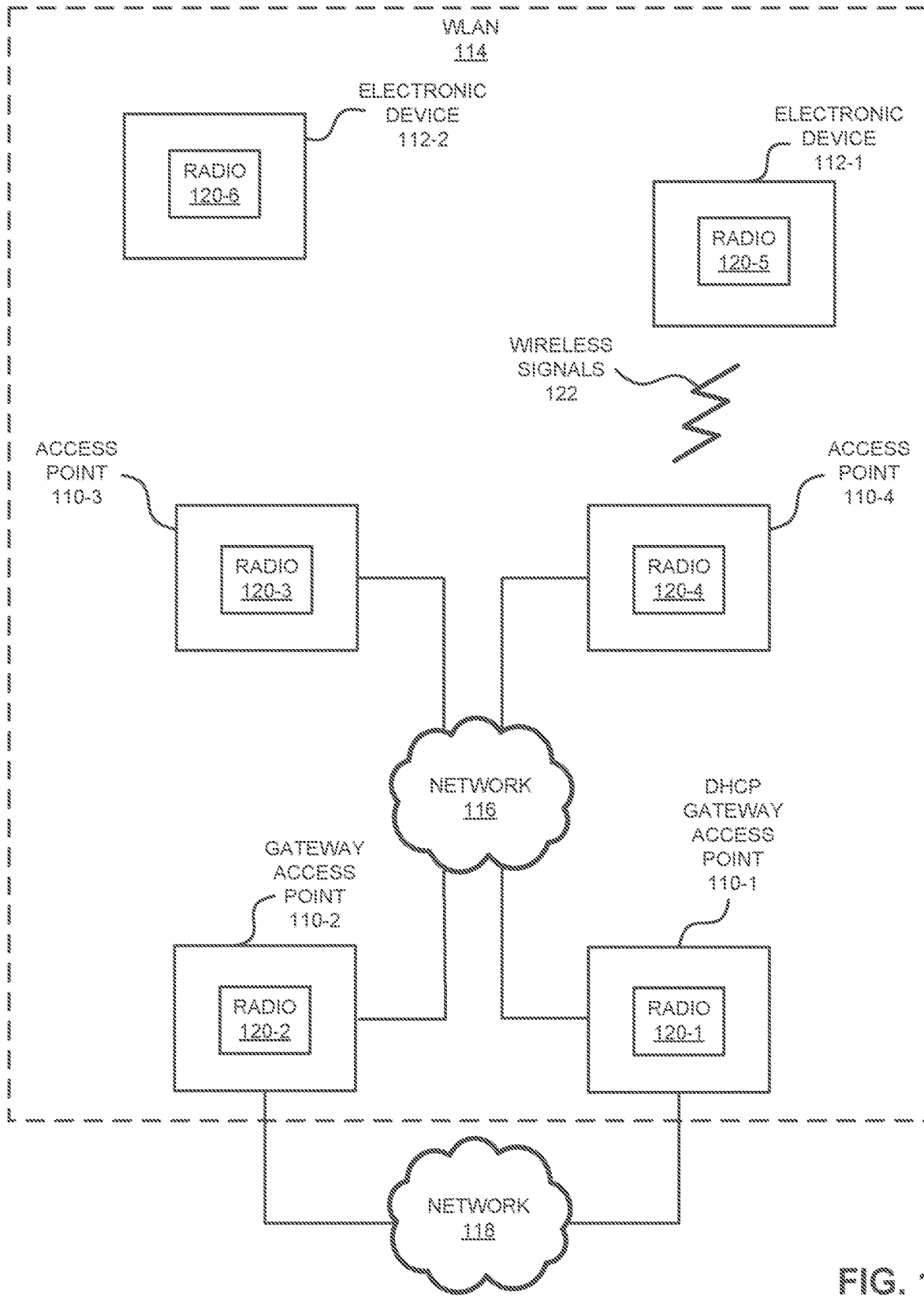
FIG. 1 is a block diagram illustrating communication among access points and electronic devices in a subnet in accordance with an embodiment of the present disclosure.

An access point that provides dynamic load balancing is described. During operation, this access point may receive a message from a second access point with second information specifying loading of the second access point. Then, the access point may receive a DHCP request from an electronic device in a WLAN with an IP address of the access point and a MAC address of the electronic device. Next, the access point may determine, based at least in part on information specifying loading of the access point, the second information and the MAC address, an assigned IP address of a gateway for the electronic device to access a second network (such as the Internet), where the assigned IP address is one of the IP address of the access point, or a second IP address of the second access point, and the access point communicates with the second network using wired communication that is compatible with a backhaul communication protocol. Moreover, the access point may provide a DHCP response to the electronic device with the assigned IP address.

By providing dynamic load balancing, this communication technique may provide improved communication performance (such as improved throughput, load balancing and robust communication) when using access points that communicate with a second network using the backhaul communication protocol. Consequently, the communication technique may improve the user experience when using the access point and communicating via the WLAN and/or the second network without increasing the cost or the complexity of the network.

In the discussion that follows, the electronic device and the access point communicate packets in accordance with a wireless communication protocol, such as an Institute of Electrical and Electronics Engineers (IEEE) 802.11 standard (which is sometimes referred to as 'Wi-Fi,' from the Wi-Fi Alliance of Austin. Tex.), Bluetooth (from the Bluetooth Special Interest Group of Kirkland. Wash.), and/or another type of wireless interface. In the discussion that follows. Wi-Fi is used as an illustrative example. However, a wide variety of communication protocols (such as Long Term Evolution or LTE, another cellular-telephone communication protocol, etc.) may be used.

Moreover, the access point may communicate with other access points and/or computers in the network using a wired communication protocol, such as an IEEE 802.3 standard (which is sometimes referred to as 'Ethernet'), a cable modem communication protocol (such as a communication protocol that is compatible with a Data of Cable Service Interface Specification or DOCSIS), a communication protocol that provides mobile LTE backhaul, e.g., to a mobile network core and/or another type of wired interface. Note that the wired communication protocol is sometimes referred to as a 'backhaul communication protocol.' In the discussion that follows, a cable modem communication protocol is used as an illustrative example of communication between one or more gateway access points and a network that is external to a WLAN.

FIG. 1 presents a block diagram illustrating an example of communication among one or more access points 110 and electronic devices 112 (such as a cellular telephone, and which are sometimes referred to as 'clients') in a WLAN 114 in accordance with some embodiments. Access points 110 may be arranged in a hierarchy in WLAN 114. Notably, access points 110 may communicate with each other in WLAN 114 using wireless and/or wired communication (such as by using Ethernet or a communication protocol that is compatible with Ethernet). Moreover, at least some of access points 110 may have specific functions in WLAN 114, such as: one or more gateway access points (e.g., gateway access points 110-1 and 110-2) that provide access to network 118 (such as the Internet, a cable network, a cellular-telephone network, etc.) and/or one or more DHCP access points (e.g., one of gateway access points 110-1 and 110-2) that process DHCP requests. In some embodiments, one of gateway access points 110-1 and 110-2 (e.g., gateway access point 110-1) may provide DHCP functionality (as indicated by DHCP gateway access point 110-1 in FIG. 1), and the other gateway access point (e.g., gateway access point 110-2) may provide backup of failover support (such as for DHCP functionality and/or network address translation or NAT functionality) in the event that gateway access point 110-1 fails or is unavailable. Consequently, gateway access point 110-1 may be a primary DHCP server and gateway access point 110-2 may be a secondary DHCP server. Additionally, gateway access points 110-1 and 110-2 may provide NAT functionality (which modifies network address information to map between different IP address spaces, such as an IP address space of network 118 and an P address space within WLAN 114) for respective subsets of access points 110-3 and 110-4 (which are non-gateway access points) and electronic devices 112 that are assigned to or handled by gateway access point 110-1 or 110-2. For example, a given gateway access point (such as gateway access point 110-1) may perform a mapping from an IP address of gateway access point 110-1 to IP addresses of at least a subset of access points 110-3 and 110-4 and electronic devices 112 in WLAN 114. Thus, at a given time, one of gateway access points 110-1 and 110-2 (such as gateway access point 110-1) may provide the functions of a DHCP server, such as assigning IP addresses and performing NAT functionality for a first subset of electronic devices in WLAN 114, while the other gateway access point (such as gateway access point 110-2) provides NAT functionality for a second subset of electronic devices in WLAN 114. In some embodiments, gateway access points 110-1 and 110-2 may allow at least portions of WLAN 114 to implement one or more virtual local area networks (VLANs).

Note that access points 110 may include a physical access point and/or a virtual access point that is implemented in software in an environment of an electronic device or a computer. In addition, at least some of access points 110 (such as access points 110-3 and 110-4) may communicate with electronic devices 112 using wireless communication.

The wired and/or wireless communication among access points 110 in WLAN 114 may occur via network 116 (such as an intra-net, a mesh network, point-to-point connections and/or the Internet) and may use a network communication protocol, such as Ethernet. This network may include one or more routers and/or switches (not shown). Furthermore, the wireless communication using Wi-Fi may involve; transmitting advertising frames on wireless channels, detecting one another by scanning wireless channels, establishing connections (for example, by transmitting association or attach requests), and/or transmitting and receiving packets (which may include the association requests and/or additional information as payloads). In some embodiments, the wired and/or wireless communication among access points 110 also involves the use of dedicated connections, such as via a peer-to-peer (P2P) communication technique. Note that gateway access points 110-1 and 110-2 may support wired communication within WLAN 114 (such as Ethernet), wireless communication with WLAN 114 (such as Wi-Fi) and a wired communication protocol for communicating via network 118 (such as a cable modem communication protocol).

Figure 6:
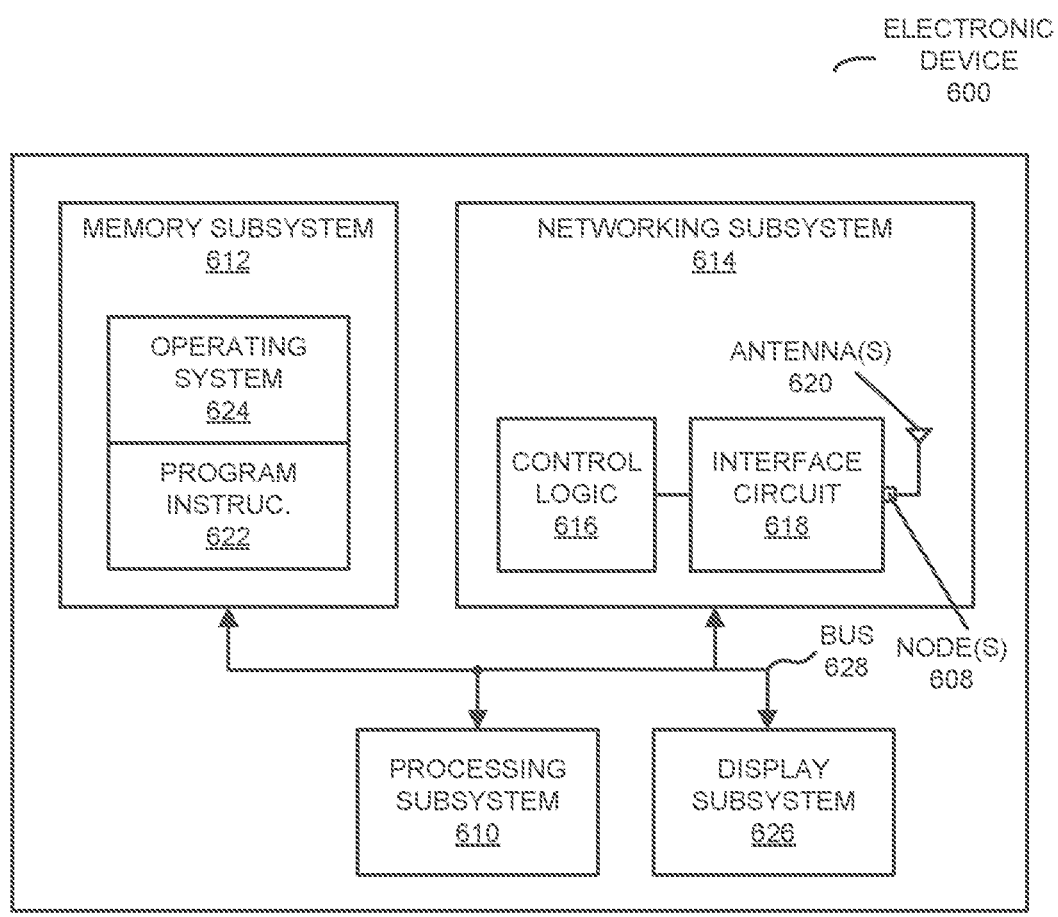
FIG. 6 is a block diagram illustrating an electronic device in accordance with an embodiment of the present disclosure.

As described further below with reference to FIG. 6, access points 110 and/or electronic devices 112 may include subsystems, such as a networking subsystem, a memory subsystem and a processor subsystem. In addition, access points 110 and electronic devices 112 may include radios 120 in the networking subsystems. More generally, access points 110 and electronic devices 112 can include (or can be included within) any electronic devices with the networking subsystems that enable access points 110 and electronic devices 112 to communicate with each other using wireless and/or wired communication. This wireless communication can comprise transmitting advertisements on wireless channels to enable access points 110 and/or electronic devices 112 to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 120 are shown in access points 110 and electronic devices 112, one or more of these instances may be different from the other instances of radios 120.

As can be seen in FIG. 1, wireless signals 122 (represented by a jagged line) are transmitted from radio 120-4 in access point 110-4. These wireless signals may be received by radio 120-5 in electronic device 112-1. Notably, access point 110-4 may transmit packets. In turn, these packets may be received by electronic device 112-1. Moreover, access point 110-4 may allow electronic device 112-1 to communicate with other electronic devices, computers and/or servers via networks 116 and/or 118.

Note that the communication among access points 110 and/or with electronic devices 112 may be characterized by a variety of performance metrics, such as: a received signal strength (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

In the described embodiments processing a packet or frame in access points 110 and electronic devices 112 includes, receiving signals (such as wireless signals 122) with the packet or frame; decoding/extracting the packet or frame from received wireless signals 122 to acquire the packet or frame, and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As noted previously, depending on the activity in WLAN 114 and/or network 118, one or more of gateway access points 110-1 and 110-2 can become overloaded, which can result in degraded communication performance between WLAN 114 and network 118. As described further below with reference to FIGS. 2-5, the NAT functionality and/or the DHCP functionality may be provided by either or both of gateway access points 110-1 and 110-2 using the communication technique. Notably, one or more of gateway access points 110-1 and 110-2, which currently provide(s) DHCP functionality, may provide or perform dynamic load balancing between gateway access points 110-1 and 110-2. For example, gateway access point 110-1 may currently provide DHCP functionality in WLAN 114. During operation, gateway access point 110-1 may receive a message from gateway access point 110-2, where the message includes second information specifying loading of gateway access point 110-2 (such as MAC and IP address information of gateway access point 110-2, as well as any of access points 110 and/or electronic devices 12 that are associated or connected with gateway access point 110-2). Note that the message may be received using wired and/or wireless communication of one or more packets or frames.

Then, gateway access point 110-1 may receive a DHCP request from an electronic device (such as electronic device 112-2) that is a new client in W LAN 114, where the DHCP request includes an IP address of gateway access point 110-1 and a MAC address of electronic device 112-2. Note that the DHCP request may be received by wireless communication of one or more packets or frames with electronic device 112-2, either directly (e.g., via wireless communication with gateway access point 110-1) or indirectly (e.g., via wireless communication with one of access points 110-3 or 110-4, which communicates with gateway access point 110-1 via wired communication). Next, gateway access point 110-1 may determine, based at least in part on information specifying loading of gateway access point 110-1, the second information and the MAC address (and, more generally, information in one or more fields in a frame or packet header received from electronic device 112-2), an assigned IP address of a gateway for electronic device 112-2 to access network 118, where the assigned IP address is one of: the IP address of gateway access point 110-1, or a second IP address of gateway access point 110-2. For example, gateway access point 110-1 may determine the assigned IP address using one of: a hash function, or a predetermined look-up table. In some embodiments, the has function or the predetermined look-up table use the last byte of the MAC address. Moreover, gateway access point 110-1 may provide a DHCP response to electronic device 112-2, where the DHCP response specifies the assigned IP address, and may include the MAC address of electronic device 112-2.

Note that given information (such as the information or the second information) specifying, respectively, loading of a given gateway access point (such as gateway access point 110-1 or 110-2) may include available memory in the given gateway access point, available throughput of the given gateway access point, available capacity of the given gateway access point, a number of electronic devices in WLAN 114 that are associated with the given gateway access point and/or dynamic states of gateway access points 110-1 and 110-2.

Moreover, gateway access point 110-1 may determine the assigned IP address based at least in part on at least a characteristic of electronic device 112-2. For example, the characteristic may include: a capability of electronic device 112-2 (such as a communication capability of electronic device 112-2), a configuration of electronic device 112-2 (e.g., a type or model of electronic device 112-2) and/or an operating system of electronic device 112-2. Alternatively or additionally, the characteristic may include a communication metric of or associated with electronic device 112-2, where the communication metric corresponds to throughput or capacity during one or more prior instances of communication with electronic device 112-2.

Thus, for the MAC address of electronic device 110-2, the assignment in the look-up table or the hash function may be based at least on the information, the second information, and/or the characteristic. Note that gateway access point 110-1 may perform a one-to-one mapping of the MAC address of electronic device 112-1 to the assigned IP address of one of gateway access point 110-1 or 110-2. Consequently, the first subset of access points 110-3 and 110-4 and electronic devices 112 may not overlap the second subset of access points 110-3 and 110-4 and electronic devices 112.

After receiving the DHCP response, electronic device 112-2 may transmit, via. e.g., access point 110-3 and network 116, an ARP request or packet to its assigned gateway access point (such as gateway access point 110-2) the assigned IP address of gateway access point 110-2. In response, gateway access point 110-2 may transmit, via network 116 and access point 110-3, an ARP response with the MAC address of gateway access point 110-2. Electronic device 112-2 may store the MAC address and/or the IP address of gateway access point 110-2 in an ARP cache.

Subsequently, electronic device 112-2 may include the MAC address and/or the IP address of gateway access point 110-2 in transmitted frames or packets, as well as the destination MAC address and/or IP address. Then, gateway access point 110-2 may handle processing of these frames or packets, such as routing them to destinations on network 118.

In this way, gateway access point 110-1 may perform load balancing or sharing among gateway access points (such as gateway access points 110-1 and 110-2) without requiring the use of expensive, enterprise-grade switches in WLAN 114. This dynamic load balancing during setup of a new client may prevent gateway access points 110-1 and/or 110-2 from becoming overloaded, and thus may improve the communication performance (such as the latency) of WLAN 114.

Moreover, because any electronic device that is connected to gateway access point 110-1 or gateway access point 110-2 is in the same WLAN (WLAN 114), roaming between gateway access points 110-1 and 110-2 can be seamless, even though only one of gateway access points 110-1 and 110-2 provides NAT functionality for a given electronic device.

Note that because of difficulty in synchronizing NAT tables between gateway access points 110-1 and 110-2, it may be difficult to perform dynamic load balancing of electronic device 110-2 between gateway access points 110-1 and 110-2 after the initial setup and onboarding of electronic device 110-2 as a new client in WLAN 114. However, in some embodiments, gateway access points 110-1 and 110-2 perform dynamic load balancing of electronic devices 112 after they have been setup or onboard in WLAN 114 (such as at an arbitrary time) based at least in part on current demand handled by gateway access points 110-1 and 110-2 (such as based at least in part on the information and the second information. As noted previously, this dynamic load balancing may involve gateway access points 110-1 and 110-2 exchanging NAT tables routinely (such as after a time interval, e.g., 1, 3, 5 or 10 min, or as needed), so that gateway access points 110-1 and 110-2 are (and remain) synchronized. Notably, the synchronization of one or more NAT tables may occur unidirectionally or bidirectionally between gateway access points 110-1 and 110-2 when an electronic device is reassigned by gateway access point 110-1 to a different one of gateway access points 110-1 and 110-2. For example, when gateway access point 110-1 reassigns electronic device 110-2 from gateway access point 110-2 to gateway access point 110-1, gateway access point 110-2 may be instructed by gateway access point 110-1 to provide information specifying its current NAT table to gateway access point 110-1.

Alternatively or additionally, one of gateway access points 110-1 and 110-2 may provide redundancy coverage in WLAN 114. For example, gateway access point 110-2 may provide redundancy coverage or hot stand-by for gateway access point 110-1. When WLAN 114 is configured and/or periodically, gateway access points 110-1 may provide a lease file with information about allocation of IP addresses, lease time and/or lease expiration times for the clients. If gateway access point 110-1 goes down, gateway access point 110-2 may use the information in the lease file to provide DHCP functionality.

During operation, gateway access point 110-1 may provide or transmit gratuitous ARP packets to gateway access point 110-2 via network 116. If gateway access point 110-2 does not receive a gratuitous ARP packet from gateway access point 110-1 within a time interval (such as 1, 5, 10, 30 or 60 s), gateway access point 110-2 may assume the IP address of gateway access point 110-1, which is in addition to an existing IP address of gateway access point 110-2. Thus, in this example, gateway access point 110-2 may have two IP addresses (i.e., gateway access point 110-2 may implement IP aliasing). Stated differently, gateway access point 110-2 may share two logical (IP) addresses, but may have a different physical (MAC) address than (now inactive) gateway access point 110-1.

Subsequently, a frame or packet from electronic device 112-1, which is intended for the (now former) IP address of gateway access point 110-1, may be received, via access point 110-4 and network 116, by gateway access point 110-2. For example, gateway access point 110-2 may employ ARP spoofing or proxy ARP. Because this frame or packet may include the MAC address of gateway access point 110-1, gateway access point 110-2 may transmit, via network 116 and access point 110-4, a message (such as a frame or a packet) to electronic device 112-1 that, in essence, indicates that the MAC address is incorrect or has changed. After receiving this message, electronic device 112-1 may transmit, via access point 110-4 and network 116, an ARP request to gateway access point 110-2 with the (now former) IP address of gateway access point 110-1. In response, gateway access point 110-2 may transmit, via network 116 and access point 110-4, an ARP response (such as a frame or a packet) with a MAC address of gateway access point 110-2. Electronic device 112-1 may store the MAC address of gateway access point 110-2 and/or the (now former) IP address of gateway access point 110-1 in an ARP cache.

Alternatively, when gateway access point 110-2 assumes the IP address of gateway access point 110-1, gateway access point 110-2 may transmit a gratuitous ARP packet to WLAN 114 (i e, the gratuitous ARP packet may be broadcast to WLAN 114), so that electronic device 112-1 can store the MAC address of gateway access point 110-2 and/or the IP address of gateway access point 110-1 in the ARP cache.

Subsequently, electronic device 112-1 may include the MAC address of gateway access point 110-2 and/or the (now former) IP address of gateway access point 110-1 in transmitted frames or packets, as well as the destination MAC address and/or IP address. Then, gateway access point 110-2 may handle processing of these frames or packets, such as routing them to destinations on network 118.

Note that, if gateway access point 110-1 is subsequently active again, this process may be revered. Notably, if gateway access point 110-2 subsequently receives, via network 116, a gratuitous ARP packet from gateway access point t 110-1, gateway access point 110-2 may no longer assume the IP address of gateway access point 110-1. Instead, gateway access point 110-1 may once again assume this IP address.

Then, a frame or packet from electronic device 112-1, which is intended for the IP address of gateway access point 110-1, may be received, via access point 110-4 and network 116, by gateway access point 110-2. Because this frame or packet may include the MAC address of gateway access point 110-1, gateway access point 110-2 may transmit, via network 116 and access point 110-4, a message (such as a frame or a packet) to electronic device 112-1 that, in essence, indicates that the MAC address is incorrect or has changed. After receiving this message, electronic device 112-1 may transmit, via access point 110-4 and network 116, an ARP request to gateway access point 110-1 with the IP address of gateway access point 110-1. In response, gateway access point 110-1 may transmit, via network 116 and access point 110-4, an ARP response (such as a frame or a packet) with the MAC address of gateway access point 110-1. Electronic device 112-1 may store the MAC address of gateway access point 110-1 and/or the IP address of gateway access point 110-1 in the ARP cache.

Alternatively, when gateway access point 110-1 reassumes the IP address, gateway access point 110-1 may transmit a gratuitous ARP packet to WLAN 114, so that electronic device 112-1 can store the MAC address of gateway access point 110-1 and/or the IP address of gateway access point 110-1 in the ARP cache.

Subsequently, electronic device 112-1 may include the MAC address of gateway access point 110-1 and/or the IP address of gateway access point 110-1 in transmitted frames or packets, as well as the destination MAC address and/or IP address. Then, gateway access point 110-1 may once again handle processing of these frames or packets, such as routing them to destinations on network 118.

In this way, gateway access point 110-2 may provide reversible or dynamic redundancy coverage for gateway access point 110-1 without requiring the use of expensive, enterprise-grade switches in WLAN 114.

While FIG. 1 illustrates access points 110 having particular functionality (gateway access point 110-1 may provide DHCP functionality, etc.), in other embodiments some or all of access points 110 may be capable of performing the DHCP function and/or the operations in the communication technique.

Figure 2:
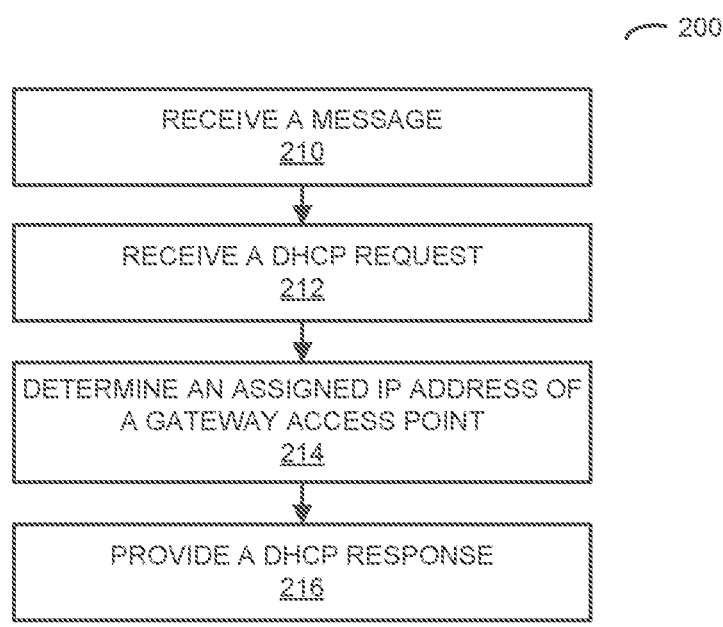
FIG. 2 is a flow diagram illustrating a method for performing dynamic load balancing using an access point in FIG. 1 in accordance with an embodiment of the present disclosure.

We now describe embodiments of the method. FIG. 2 presents a flow diagram illustrating an example of a method 200 for performing dynamic load balancing using an access point in a WLAN, such as gateway access point 110-1 in FIG. 1. Note that the access point may communicate with a network that is external to a WLAN that includes access point using a backhaul communication protocol, while communication within the WLAN may use wireless communication (such as Wi-Fi) and/or wired communication (such as Ethernet). For example, the backhaul communication protocol may include: a cable modem communication protocol, or a communication protocol that provides mobile LTE backhaul, e.g., to a mobile network core.

During operation, the access point may receive a message (operation 210) from a second access point in the WLAN (such as gateway access point 110-2 in FIG. 1), where the message includes second information specifying loading of the second access point. Then, the access point may receive a DHCP request (operation 212) from an electronic device in the WLAN (such as electronic device 110-2 in FIG. 2), where the DHCP request includes an IP address of the access point and a MAC address of the electronic device.

Next, the access point may determine, based at least in part on information specifying loading of the access point, the second information and the MAC address, an assigned IP address (operation 214) of a gateway for the electronic device to access the second network, where the assigned IP address is one of: the IP address of the access point, or a second IP address of the second access point. Note that the access point may determine (operation 214) the assigned IP address using one of, a hash function, or a look-up table.

Moreover, the access point may provide a DHCP response (operation 216) to the electronic device, where the DHCP response specifies the assigned IP address.

In some embodiments, the access point may determine (operation 214) the assigned IP address based at least in part on at least a characteristic of the electronic device. For example, the characteristic may include: a capability of the electronic device, a configuration of the electronic device and/or an operating system of the electronic device. Alternatively or additionally, the characteristic may include a communication metric of the electronic device, where the communication metric corresponds to throughput or capacity during one or more prior instances of communication with the electronic device.

Furthermore, the information may include available memory in the access point and the second information may include available memory in the second access point. Alternatively or additionally, the information may include available throughput or capacity of the access point and the second information may include available throughput or capacity of the second access point.

Additionally, the second access point may provide redundancy coverage for DHCP functions of the access point, such as if the access point fails or if communication with the access point is lost or unavailable.

Figure 3:
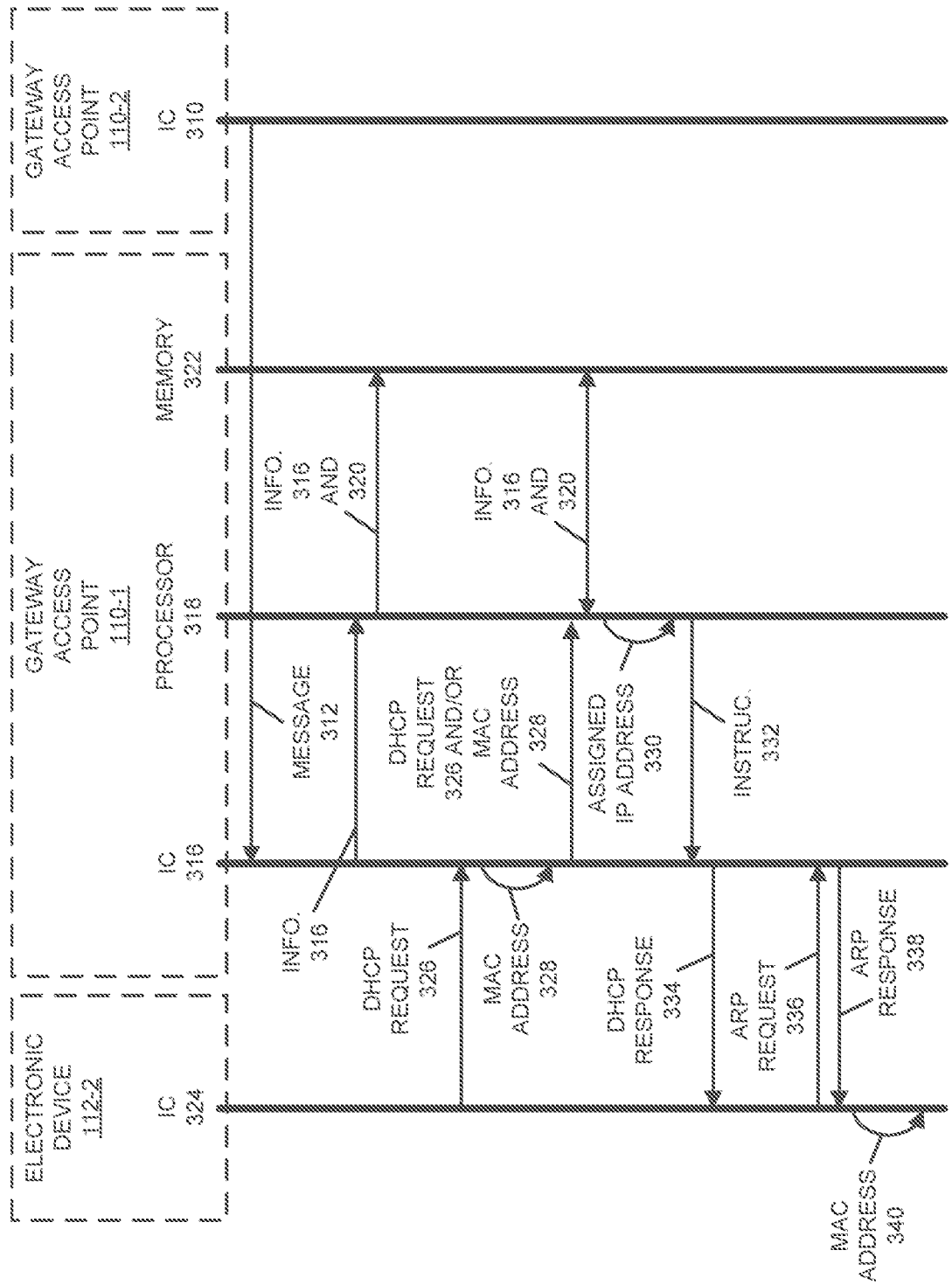
FIG. 3 is a drawing illustrating communication among the electronic devices in FIG. 1 in accordance with an embodiment of the present disclosure.

FIG. 3 presents a drawing illustrating an example of communication among gateway access points 110-1 and 110-2 and electronic device 112-2. Notably, an interface circuit (IC) 310 in gateway access point 110-2 may provide a message 312 to gateway access point 110-1 with information 314 specifying loading of gateway access point 110-2. Note that gateway access point 110-1 may provide the functions of a DHCP server in a WLAN.

After receiving message 312, interface circuit 316 in gateway access point 110-1 may provide information 314 to processor 318 in gateway access point 110-1, which may store information 314, as well as information 320 that specifies loading of gateway access point 110-1, in memory 322 in gateway access point 110-1.

Then, interface circuit 324 in electronic device 112-2 may provide a DHCP request 326 to gateway access point 110-1. This DHCP request may include an IP address of gateway access point 110-1 and a MAC address 328 of electronic device 112-2. In some embodiments, interface circuit 324 extracts MAC address 328 from DHCP request 326.

After receiving DHCP request 326, interface circuit 316 may provide DHCP request 326 and/or MAC address 328 to processor 318. Processor 318 may access information 314 and information 320 in memory 322. Moreover, based on information 314, information 320, MAC address 328 and/or other information (such as a characteristic of electronic device 112-2), processor 318 may determine an assigned IP address 330 of a gateway access point (such as gateway access point 110-1 or 110-2) that provides access for electronic device 112-2 to access a network (such as network 118 in FIG. 1) that is external to the WLAN that includes gateway access points 110-1 and 110-2 and electronic device 112-2. For example, processor 318 may perform a look-up in a predetermined table in memory 322. Alternatively or additionally, processor 318 may determine the assigned IP address 330 using a hash function. Note that the gateway access point having the assigned IP address (such as gateway access point 110-1) may communicate via the network that is external to the WLAN using the backhaul communication protocol.

Next, processor 318 may instruct 332 interface circuit 316 to provide a DHCP response 334 to electronic device 112-2, where DHCP response 334 specifies the assigned IP address 330.

After receiving DHCP response 334, interface circuit 324 may transmit to gateway access point 110-1 an ARP request 336 with the assigned IP address 330. In response, interface circuit 316 may transmit an ARP response 338 with MAC address 340 of gateway access point 110-1. Electronic device 112-2 may store MAC address 340 and/or the assigned IP address 330 in an ARP cache.

Subsequently, interface circuit 324 may include direct communication to gateway access point 110-1 for further processing, such as routing to destinations in the network that is external to the WLAN.

Figure 4:
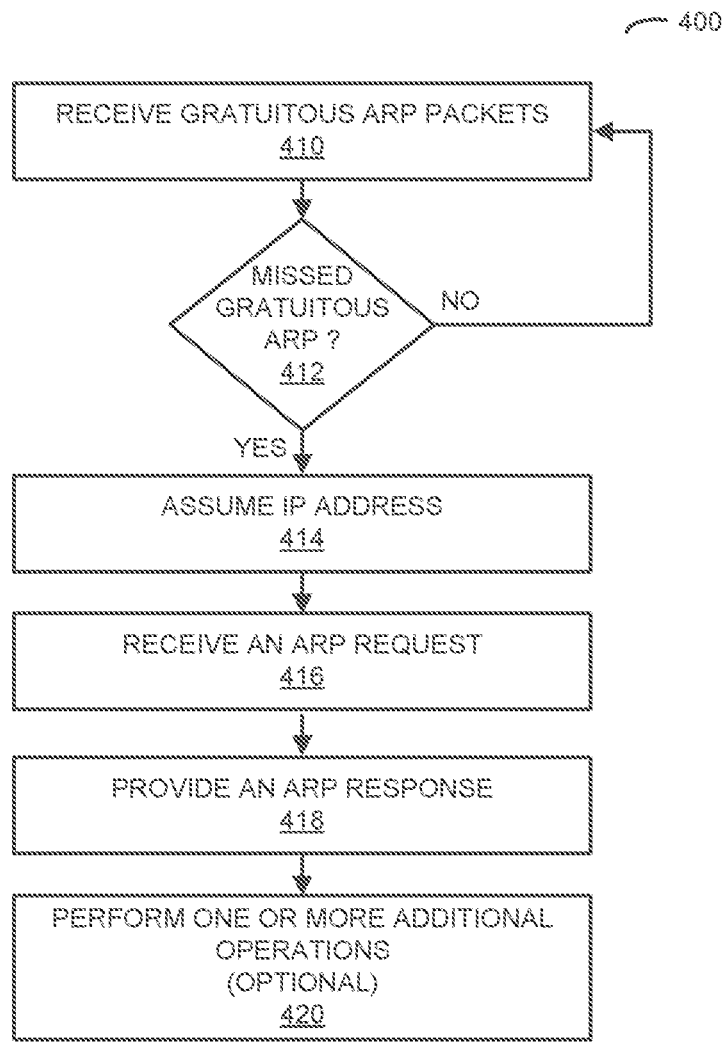
FIG. 4 is a flow diagram illustrating a method for providing redundancy coverage using an access point in FIG. 1 in accordance with an embodiment of the present disclosure.

FIG. 4 presents a flow diagram illustrating an example of a method 400 for providing redundancy coverage using an access point, such as one of gateway access points 110-1 and 110-2 in FIG. 1. During operation, the access point receives gratuitous ARP packets (operation 410) from a second access point, where the access point and the second access points are gateway access points in a WLAN, and for which the access point provides preassigned redundancy coverage. If the access point does not receive a gratuitous ARP packet (operation 412) from the second access point within a time interval, the access point may assume an IP address (operation 414) of the second access point, which is in addition to an existing IP address of the access point.

Then, the access point may receive an ARP request (operation 416) from an electronic device that includes the IP address of the second access point. In response, the access point may provide an ARP response with a MAC address of the access point (operation 418), so that subsequent packets or frames from the electronic device are directed to the access point instead of the second access point.

In some embodiments, the access point optionally performs one or more additional operations (operation 420). For example, if the access point subsequently receives a gratuitous ARP packet from the second access point, the access point may no longer assume the IP address of second access point. Instead, the second access point may once again assume this IP address.

In some embodiments of methods 200 (FIG. 2) and/or 400, there may be additional or fewer operations. Furthermore, the order of the operations may be changed, and/or two or more operations may be combined into a single operation. For example, while method 400 used ARP as an illustrative example, in other embodiments the messages may be compatible with a different communication protocol. Moreover, in method 200 (FIG. 2), the DHCP request may be received from another access point (such as access point 110-3 or 110-4 in FIG. 1) instead of from electronic device 110-2.

Figure 5:
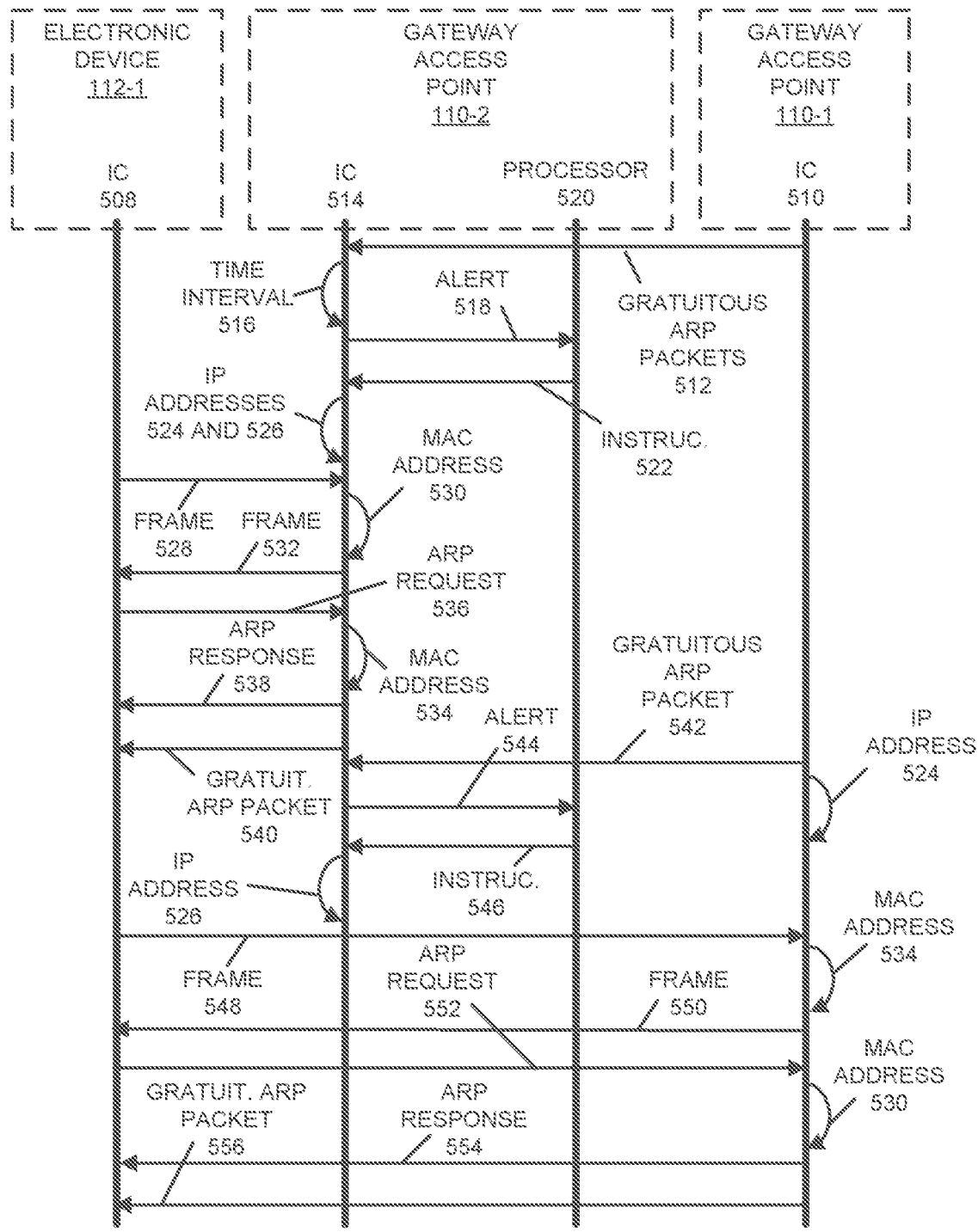
FIG. 5 is a drawing illustrating communication among the electronic devices in FIG. 1 in accordance with an embodiment of the present disclosure.

FIG. 5 presents a drawing illustrating an example of communication among electronic device 112-1 and gateway access points 110-1 and 110-2. Notably, interface circuit 510 in gateway access point 110-1 may provide gratuitous ARP packets 512 to interface circuit 514 in gateway access point 110-2.

If interface circuit 514 in gateway access point 110-2 does not receive a gratuitous ARP packet from gateway access point 110-1 within a time interval 516 (such as 1, 5, 10, 30 or 6 s), interface circuit 514 may provide an alert 518 to processor 520 in gateway access point 110-2. In response, processor 520 may instruct 522 interface circuit 514 to assume IP address 524 of gateway access point 110-1, which is in addition to an existing IP address 526 of gateway access point 110-2.

Subsequently, interface circuit 508 in electronic device 112-1 may transmit a frame (or packet) 528 to IP address 524 (and, thus, to gateway access point 110-2, which may employ ARP spoofing or proxy ARP). After receiving frame 528, interface circuit 514 may transmit a frame (or packet) 532 to electronic device 112-1 because frame 528 may include MAC address 530 of gateway access point 110-1 instead of MAC address 534 of gateway access point 110-2. Frame 532 may indicate that MAC address 530 is incorrect or has changed. After receiving frame 532, interface circuit 508 may transmit an ARP request 536 to gateway access point 110-2 with IP address 524. In response, interface circuit 514 may transmit an ARP response 538 with MAC address 534. Based on ARP response 538, electronic device 112-1 may store MAC address 534 and/or IP address 524 in an ARP cache.

Alternatively, when gateway access point 110-2 assumes IP address 524, interface circuit 514 may transmit a gratuitous ARP packet 540 to a WLAN (such as WLAN 114 in FIG. 1), so that electronic device 112-1 can store MAC address 534 and/or the IP address 524 in the ARP cache.

Then, interface circuit 508 may include MAC address 534 and/or IP address 524 in transmitted frames or packets, as well as the destination MAC address and/or IP address. Moreover, gateway access point 110-2 may handle processing of these frames or packets, such as routing them to their destination(s).

Note that, if gateway access point 110-1 is subsequently active again, this process may be revered. Notably, if interface circuit 514 receives a gratuitous ARP packet 542 from gateway access point 110-1 and provides alert 544 to processor 520, processor 520 may instruct 546 interface circuit 514 to no longer assume IP address 524. Instead, gateway access point 110-1 may once again assume IP address 524.

Next, interface circuit 508 may transmit a frame (or packet) 548 to IP address 524 (and, thus, to gateway access point 110-1). After receiving frame 548, interface circuit 510 may transmit a frame (or packet) 550 to electronic device 112-1 because frame 548 may include MAC address 534 of gateway access point 110-2 instead of MAC address 530 of gateway access point 110-1. Therefore, frame 550 may indicate that MAC address 534 is incorrect or has changed. Moreover, after receiving frame 550, interface circuit 508 may transmit an ARP request 552 to gateway access point 110-1 with IP address 524. In response, gateway access point 110-1 may transmit an ARP response 554 with MAC address 530 of gateway access point 110-1. Based on ARP response 554, electronic device 112-1 may store MAC address 530 and/or IP address 524 in the ARP cache.

Alternatively, when gateway access point 110-2 reassumes IP address 524, interface circuit 510 may transmit a gratuitous ARP packet 556 to the WLAN, so that electronic device 112-1 can store MAC address 530 and/or the IP address 524 in the ARP cache.

Furthermore, interface circuit 508 may include MAC address 530 and/or IP address 524 in transmitted frames or packets, as well as the destination MAC address and/or IP address. Additionally, gateway access point 110-1 may once again handle processing of these frames or packets, such as routing then to their destination(s), e.g., in a network (such as network 118 in FIG. 1) that is external to the WLAN, such as a network in which communication uses a backhaul communication protocol.

While FIGS. 3 and 5 illustrate communication between components using unidirectional or bidirectional communication with lines having single arrows or double arrows, in general the communication in a given operation in these figures may involve unidirectional or bidirectional communication.

Note that in embodiments in which a gateway access point (such as gateway access point 110-1 in FIG. 1) is used to provide backhaul for LTE as well as Ethernet, when there is a failover from Ethernet to LTE (e.g., when an Ethernet connection is lost and the LTE connection becomes active), the network address translation or NAT functionality may be restarted. This may ensure that services at one or more clients (such as electronic device 112-1 in FIG. 1) are not affected. For example, by restarting the network address translation or NAT functionality, there may be minimal down time in the wireless service at the one or more clients.

We now describe embodiments of an electronic device, which may perform at least some of the operations in the communication technique. FIG. 6 presents a block diagram illustrating an example of an electronic device 600 in accordance with some embodiments, such as one of access points 110 or electronic devices 112. This electronic device includes processing subsystem 610, memory subsystem 612, and net-working subsystem 614. Processing subsystem 610 includes one or more devices configured to perform computational operations. For example, processing subsystem 610 can include one or more microprocessors, ASICs, microcontrollers, programmable-logic devices, one or more graphics process units (GPUs) and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include, one or more program modules or sets of instructions (such as program instructions 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted. e.g., configurable or configured (which may be used interchangeably in this discussion) to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including control logic 616, an interface circuit 618 and one or more antennas 620 (or antenna elements). (While FIG. 6 includes one or more antennas 620, in some embodiments electronic device 600 includes one or more nodes, such as nodes 608, e.g., a network node that can be coupled or connected to a network or link, or a pad that can be coupled to the one or more antennas 620. Thus, electronic device 600 may or may not include the one or more antennas 620.) For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, a cable modem networking system, and/or another networking system.

Note that a transmit or receive antenna pattern (or antenna radiation pattern) of electronic device 600 may be adapted or changed using pattern shapers (such as reflectors) in one or more antennas 620 (or antenna elements), which can be independently and selectively electrically coupled to ground to steer the transmit antenna pattern in different directions. Thus, if one or more antennas 620 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 600 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 600 may use the mechanisms in networking subsystem 614 for performing simple wireless communication between the electronic devices. e.g., transmitting advertising or beacon frames and/or scanning for advertising frames transmitted by other electronic devices as described previously.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections among the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included m) a desktop computer, a laptop computer, a subnotebook/netbook, a server, a tablet computer, a smartphone, a cellular telephone, a smartwatch, a consumer-electronic device, a portable computing device, an access point, a transceiver, a router, a switch, communication equipment, an access point, a controller, test equipment, and/or another electronic device.

Although specific components are used to describe electronic device 600, in alternative embodiments, different components and/or subsystems may be present in electronic device 600. For example, electronic device 600 may include one or more additional processing subsystems, memory subsystems, networking subsystems, and/or display subsystems. Additionally, one or more of the subsystems may not be present in electronic device 600. Moreover, in some embodiments, electronic device 600 may include one or more additional subsystems that are not shown in FIG. 6. Also, although separate subsystems are shown in FIG. 6, in some embodiments some or all of a given subsystem or component can be integrated into one or more of the other subsystems or component(s) in electronic device 600. For example, in some embodiments program instructions 622 are included in operating system 624 and/or control logic 616 is included in interface circuit 618. In some embodiments, the communication technique is implemented using information in layer 2 and/or layer 3 of the Open System Interconnection model.

Moreover, the circuits and components in electronic device 600 may be implemented using any combination of analog and/or digital circuitry, including bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 614 (or, more generally, of electronic device 600). The integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a cable modem communication protocol. Ethernet and a Wi-Fi communication protocol as an illustrative example, in other embodiments a wide variety of communication protocols and, more generally, wired and/or wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 622, operating system 624 (such as a driver for interface circuit 618) or in firmware in interface circuit 618. Alternatively or additionally, at least some of the operations in the communication technique may be implemented in a physical layer, such as hardware in interface circuit 618.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many, modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
   a network node;
   an antenna node configured to couple to an antenna; and
   an interface circuit, coupled to the network node and the antenna node, configured to communicate via wired or wireless communication with an electronic device in a wireless local area network (WLAN) and to communicate via wired communication with a second access point in the WLAN and a second electronic device in a second network, wherein the wired communication is the second network is compatible with a backhaul communication protocol, and wherein the access point is configured to:
      receive a message associated with the second access point, wherein the message comprises second information specifying loading of the second access point;
      receive a Dynamic Host Configuration Protocol (DHCP) request associated with the electronic device, wherein the DHCP request comprises an Internet protocol (IP) address of the access point and a media access control (MAC) address of the electronic device;
      determine, based at least in part on information specifying loading of the access point, the second information and the MAC address, an assigned IP address of a gateway for the electronic device to access the second network, wherein the assigned IP address is one of: the IP address of the access point, or a second IP address of the second access point; and
      provide a DHCP response intended for the electronic device, wherein the DHCP response specifies the assigned IP address.

2. The access point of claim 1, wherein the access point determines the assigned IP address using one of: a hash function, or a look-up table.

3. The access point of claim 1, wherein the access point determines the assigned IP address based at least in part on at least a characteristic of the electronic device.

4. The access point of claim 3, wherein the characteristic comprises: a capability of the electronic device, a configuration of the electronic device or an operating system of the electronic device.

5. The access point of claim 3, wherein the characteristic comprises a communication metric of the electronic device; and
   wherein the communication metric corresponds to throughput or capacity during one or more prior instances of communication with the electronic device.

6. The access point of claim 1, wherein the backhaul communication protocol comprises: a cable modem communication protocol, or a communication protocol that provides mobile Long Term Evolution (LTE) backhaul.

7. The access point of claim 1, wherein the second access point is configured to provide redundancy coverage for DHCP functions of the access point.

8. The access point of claim 1, wherein the information comprises available memory in the access point and the second information comprises available memory in the second access point.

9. The access point of claim 1, wherein the information comprises available throughput or capacity of the access point and the second information comprises available throughput or capacity of the second access point.

10. The access point of claim 1, comprising:
    a processor; and
    memory configured to store program instructions, wherein, when executed by the processor, the program instructions cause the access point to perform at least the determining operation.

11. A non-transitory computer-readable storage medium for use in conjunction with an access point, the computer-readable storage medium storing program instructions that, when executed by the access point, causes the access point perform dynamic load balancing by performing operations comprising:
    receiving a message associated with a second access point, wherein the message comprises second information specifying loading of the second access point;
    receiving a Dynamic Host Configuration Protocol (DHCP) request associated with an electronic device in a wireless local area network (WLAN), wherein the DHCP request comprises an Internet protocol (IP) address of the access point and a media access control (MAC) address of the electronic device;
    determining, based at least in part on information specifying loading of the access point, the second information and the MAC address, an assigned IP address of a gateway for the electronic device to access a second network, wherein the assigned IP address is one of: the IP address of the access point, or a second IP address of the second access point, and wherein the access point communicates with the second network using wired communication that is compatible with a backhaul communication protocol; and
    providing a DHCP response intended for the electronic device, wherein the DHCP response specifies the assigned IP address.

12. The non-transitory computer-readable storage medium of claim 11, wherein the access point determines the assigned IP address using one of: a hash function, or a look-up table.

13. The non-transitory computer-readable storage medium of claim 11, wherein the access point determines the assigned IP address based at least in part on at least a characteristic of the electronic device.

14. The non-transitory computer-readable storage medium of claim 13, wherein the characteristic comprises: a capability of the electronic device, a configuration of the electronic device or an operating system of the electronic device.

15. The non-transitory computer-readable storage medium of claim 13, wherein the characteristic comprises a communication metric of the electronic device; and
wherein the communication metric corresponds to throughput or capacity during one or more prior instances of communication with the electronic device.

16. The non-transitory computer-readable storage medium of claim 11, wherein the backhaul communication protocol comprises: a cable modem communication protocol, or a communication protocol that provides mobile Long Term Evolution (LTE) backhaul.

17. The non-transitory computer-readable storage medium of claim 11, wherein the information comprises available memory in the access point and the second information comprises available memory in the second access point.

18. The non-transitory computer-readable storage medium of claim 11, wherein the information comprises available throughput or capacity of the access point and the second information comprises available throughput or capacity of the second access point.

19. A method for performing dynamic load balancing, comprising:
by an access point;
receiving a message associated with a second access point, wherein the message comprises second information specifying loading of the second access point;
receiving a Dynamic Host Configuration Protocol (DHCP) request associated with an electronic device in a wireless local area network (WLAN), wherein the DHCP request comprises an Internet protocol (IP) address of the access point and a media access control (MAC) address of the electronic device;
determining, based at least in part on information specifying loading of the access point, the second information and the MAC address, an assigned IP address of a gateway for the electronic device to access a second network, wherein the assigned IP address is one of: the IP address of the access point, or a second IP address of the second access point, and wherein the access point communicates with the second network using wired communication that is compatible with a backhaul communication protocol; and
providing a DHCP response intended for the electronic device, wherein the DHCP response specifies the assigned IP address.

20. The method of claim 19, wherein the backhaul communication protocol comprises: a cable modem communication protocol, or a communication protocol that provides mobile Long Term Evolution (LTE) backhaul.

\* \* \* \* \*

UNITED STATES PATENT AND TRADEMARK OFFICE
CERTIFICATE OF CORRECTION

| | |
|---|---|
| PATENT NO. | : 11,197,197 B2 |
| APPLICATION NO. | : 16/894779 |
| DATED | : December 7, 2021 |
| INVENTOR(S) | : Bhatnagar et al. |

It is certified that error appears in the above-identified patent and that said Letters Patent is hereby corrected as shown below:

On the Title Page

Item (57) Abstract, Lines 1-2: Please correct "receives a message a message from" to read --receives a message from--

In the Claims

Column 17, Lines 41-42, Claim 1: Please correct "communication is the second network is compatible" to read --communication in the second network is compatible--

Column 18, Lines 39-40, Claim 11: Please correct "point perform" to read --point to perform--

Signed and Sealed this
Twentieth Day of June, 2023

Katherine Kelly Vidal
*Director of the United States Patent and Trademark Office*